United States Patent [19]

Posar

[11] Patent Number: 5,849,167
[45] Date of Patent: Dec. 15, 1998

[54] METHOD FOR MAKING A BIPOLAR MEMBRANE

[75] Inventor: Francesco Posar, Rosignano-Solvay/Li, Italy

[73] Assignee: SOLVAY (Société Anonyme, Brussels, Belgium

[21] Appl. No.: 809,182

[22] PCT Filed: Sep. 12, 1995

[86] PCT No.: PCT/EP95/03596

§ 371 Date: Jun. 10, 1997

§ 102(e) Date: Jun. 10, 1997

[87] PCT Pub. No.: WO96/09337

PCT Pub. Date: Mar. 28, 1996

[30] Foreign Application Priority Data

Sep. 20, 1994 [IT] Italy ................... MI94A1905

[51] Int. Cl.$^6$ .................................. B01D 61/44
[52] U.S. Cl. .................. 204/534; 204/537; 204/296; 204/631; 521/27
[58] Field of Search .................... 204/534, 537, 204/296, 631; 521/27

[56] References Cited

U.S. PATENT DOCUMENTS

| 4,238,305 | 12/1980 | Gancy et al. . | |
|---|---|---|---|
| 5,227,040 | 7/1993 | Simons | 204/296 |
| 5,380,413 | 1/1995 | Posar et al. | 204/296 |

FOREIGN PATENT DOCUMENTS

| 0459820 | 12/1991 | European Pat. Off. . |
|---|---|---|
| 2122543 | 1/1984 | United Kingdom . |
| 89/01059 | 2/1989 | WIPO . |

*Primary Examiner*—Arun S. Phasge
*Attorney, Agent, or Firm*—Spencer & Frank

[57] ABSTRACT

Process for the manufacture of a bipolar membrane, according to which an anionic membrane is joined side by side to a cationic membrane, the membranes having been subjected beforehand to a conditioning pretreatment, the conditioning pretreatment of the anionic membrane comprising bringing the latter into contact with a compound of a polyvalent metal and with an aqueous alkali metal hydroxide solution and the conditioning pretreatment of the cationic membrane essentially comprising bringing the said cationic membrane into contact with water which is essentially free from polyvalent metal and from alkali metal. Use of the bipolar membrane thus obtained for the manufacture of aqueous sodium hydroxide solutions by electrodialysis.

10 Claims, No Drawings

METHOD FOR MAKING A BIPOLAR MEMBRANE

This application is a 371 of PCT/EP95/03596 filed Sep. 12, 1995.

The present invention relates to a process for the manufacture of bipolar membranes.

Bipolar membranes are constituent components of electrodialysis cells. The latter are well known in technology where they are especially used for the manufacture of acids and bases starting from their salts.

In processes which are generally used for manufacturing bipolar membranes, a cationic membrane and an anionic membrane, which have been subjected beforehand to a conditioning pretreatment, are joined side by side. To this end, in International Application WO 89/01059 (Unisearch Limited), a description is given of a process for the manufacture of a bipolar membrane, according to which a cationic membrane and an anionic membrane are subjected to an identical conditioning pretreatment which comprises bringing them into contact with an aqueous solution of a salt of a metal other than sodium or potassium and with an alkaline solution (generally an aqueous sodium hydroxide solution); the membranes recovered from the conditioning pretreatment are then superimposed to constitute the bipolar membrane.

The bipolar membranes obtained by means of the known process described above are generally characterized by good mechanical strength and moderate electrical resistance.

The known process which has just been described with reference to International Application WO 89/01059 necessitates, before the two unipolar membranes (the anionic membrane and the cationic membrane) are joined side by side, subjecting them to a conditioning pretreatment with a polyvalent metal salt, on the one hand, and with an aqueous alkali metal hydroxide solution, on the other hand. This known process in this way requires a large number of industrial operations, which complicates it and renders it expensive.

The objective of the invention is to simplify the above-mentioned known process, without harming the performance of the bipolar membranes obtained.

Consequently, the invention relates to a process for the manufacture of a bipolar membrane, according to which an anionic membrane is joined side by side to a cationic membrane, the membranes having been subjected beforehand to a conditioning pretreatment with an aqueous medium, the conditioning pretreatment of the anionic membrane comprising bringing the latter into contact with a compound of a polyvalent metal and with an aqueous alkali metal hydroxide solution and the conditioning pretreatment of the cationic membrane with the aqueous medium essentially comprising bringing the said cationic membrane into contact with water which is essentially free from polyvalent metal and from alkali metal.

Cationic membrane is understood to denote a thin, non-porous sheet which is selectively permeable to cations and impermeable to anions. The cationic membranes which can be used in the process according to the invention must be made of a material which is inert with respect to aqueous acidic or basic solutions. Cationic membranes which can be used in the process according to the invention are, for example, sheets made from fluorinated polymer containing functional groups derived from sulphonic acids, carboxylic acids or phosphonic acids or mixtures of such functional groups, these groups acting as permanent cationic sites of the membrane. Examples of membranes of this type are those known under the name Raipore (Pall Rai) and under the trade name Morgane (Solvay), in particular the membranes Raipore R-4010, Morgane CDS and Morgane CRA.

By definition, an anionic membrane is a thin, non-porous sheet which is selectively permeable to anions and impermeable to cations. Anionic membranes which can be used in the process according to the invention are sheets made from a polymeric material which is inert with respect to aqueous acidic or basic solutions and which comprises quaternary ammonium groups acting as permanent anionic sites. The membranes Raipore R-1030, Raipore R-4030 and Morgane ADP are examples of anionic membranes which can be used in the process according to the invention.

Bipolar membranes are membranes which exhibit, on one face, the properties of a cationic membrane and, on the other face, the properties of an anionic membrane.

The thickness of the anionic and cationic membranes will condition the mechanical and electrochemical properties of the bipolar membrane obtained on conclusion of the process according to the invention. The optimum thickness of the anionic and cationic membranes will result from a compromise between satisfactory mechanical strength (a property favored by high thicknesses) and low transverse electrical resistance (a property favored by low thicknesses). In practice, the thickness of the anionic and cationic membranes is generally greater than 10 $\mu$m, preferably at least equal to 20 $\mu$m. It is generally less than 250 $\mu$m and rarely exceeds 200 $\mu$m, the most appropriate thicknesses generally being from 30 to 150 $\mu$m.

In the process according to the invention, the polyvalent metal is advantageously selected from transition metals. Chromium, iron, nickel, rhodium, zirconium and ruthenium are preferred. Chromium is very particularly suitable.

The polyvalent metal compound is preferably an inorganic salt. The latter can advantageously be selected from chlorides, nitrates, phosphates and sulphates. Chlorides are preferred and, among the latter, chromic chloride is especially recommended. Hydrated chromic chloride is advantageously used, chromic chloride hexahydrate being preferred.

In the conditioning pretreatment of the anionic membrane, the said anionic membrane is brought into contact with the polyvalent metal compound in order to substitute at least a part of the counterions of the anionic membrane with ions of the polyvalent metal. The ions of the polyvalent metal are generally complex cations. The aim is generally to incorporate, in the anionic membrane, an amount of cations of the polyvalent metal greater than 10 (preferably equal to 20) and less than 100 (preferably not exceeding 50) mg per $m^2$ of the face of the anionic membrane intended to come into contact with the cationic membrane, the values from 25 to 40 mg/$m^2$ generally being well suited.

The anionic membrane can advantageously be brought into contact with the polyvalent metal compound by using an aqueous solution of the polyvalent metal compound with which is subsequently impregnated the face of the anionic membrane which is intended to adjoin the cationic membrane in the bipolar membrane. The said face of the anionic membrane can be impregnated with the said aqueous solution, for example, by painting the membrane by means of a brush, by spraying the solution over the membrane or by immersion of the latter in a bath of the solution. In this embodiment of the invention, the aqueous solution of the polyvalent metal compound can be, without distinction, an acidic solution, a basic solution or a solution of neutral pH. Basic solutions are preferred, in particular those where the pH is at least equal to 10, preferably to 12. The concentration of the aqueous solution is not critical, concentrated solutions being, however, preferred. In practice, the use is recommended of aqueous solutions in which the concentration of polyvalent metal compound is at least equal to 0.1 (preferably to 0.5) mol/l. The maximum allowable concentration of the aqueous solution of the polyvalent metal compound is that which corresponds to saturation and it consequently depends on various parameters such as the nature of the polyvalent metal compound, the temperature of the solution and the value of the pH of the latter. It is preferable to use solutions at a temperature in the region of room temperature, for example from 15° to 35° C.

The anionic membrane can be brought into contact with the polyvalent metal compound equally well at room temperature or at high temperature, it being necessary, however, for the latter to remain below the thermal degradation temperature of the anionic membrane. The duration of the treatment must be sufficient to incorporate the desired number of polyvalent metal ions in the anionic membrane. It will consequently depend on many parameters, such as the polyvalent metal compound selected, the temperature and, when the polyvalent metal compound is used in the form of an aqueous solution, the concentration of the latter.

According to the invention, the conditioning pretreatment of the anionic membrane also comprises bringing it into contact with an aqueous alkali metal hydroxide solution. The alkali metal is not critical. Sodium and lithium are, however, preferred, lithium having proved to be especially advantageous.

The anionic membrane can be brought into contact with the aqueous alkali metal hydroxide solution, for example, by spraying the solution over the face of the anionic membrane which is intended to adjoin the cationic membrane in the bipolar membrane or by painting the said face with the solution. A preferred means is to immerse the membrane in a bath of the solution.

Although not wishing to be bound by a theoretical explanation, the Inventors think that bringing the anionic membrane into contact with the aqueous alkali metal hydroxide solution has the function of forming metal hydroxides with the polyvalent metal ions which are present in the anionic membrane. It is consequently essential, in accordance with the invention, to use a theoretical amount of the alkali metal hydroxide solution at least sufficient to form metal hydroxides with a substantial fraction of the polyvalent metal ions of the anionic membrane, the said fraction generally being at least equal to 50, preferably to 90%, of the polyvalent metal ions present in the anionic membrane.

The ultimate amount to be used, as regards the aqueous alkali metal hydroxide solution, will consequently depend on various parameters such as the amount of polyvalent metal ions in the anionic membrane, the nature of the polyvalent metal, in particular its valency, the concentration of the solution and its temperature and it can be determined in each specific case by routine laboratory work. In practice, good results are generally obtained with alkali metal hydroxide solutions containing at least 0.5 (preferably 0.8) mol of alkali metal hydroxide per litre, the maximum allowable content corresponding to saturation. Contents of 0.8 to 1.2 mol of alkali metal hydroxide per litre are generally well suited. Although solutions at room temperature may be suitable, it is preferable to use hot solutions, for example at a temperature from 50° to 90° C.

In the conditioning pretreatment of the anionic membrane, the latter can be brought into contact with the aqueous alkali metal hydroxide solution at the same time as it is brought into contact with the polyvalent metal compound, by using, to this end, an aqueous solution of the polyvalent metal compound and of alkali metal hydroxide. However, it is preferable, according to the invention, for the membrane to be brought into contact with the aqueous alkali metal hydroxide solution after it has been brought into contact with the polyvalent metal compound, the aqueous alkali metal hydroxide solution then being free from polyvalent metal compound. This preferred embodiment of the pretreatment of the anionic membrane can comprise an optional washing of the latter with demineralized water after it has been brought into contact with the polyvalent metal compound and before it is brought into contact with the alkali metal hydroxide solution, as well as after it has been brought into contact with the aqueous alkali metal hydroxide solution. Washing is generally carried out at room temperature, although lower or higher temperatures can also be suitable.

The pretreatment of the cationic membrane essentially comprises bringing the latter into contact with water. The water used must be essentially free from polyvalent metal and from alkali metal. The expression "essentially free from polyvalent metal and from alkali metal" means that the water used can optionally contain polyvalent metals and/or alkali metals but in amounts which are sufficiently low for these metals not to affect the properties of the membranes. In any event, the polyvalent metal and/or alkali metal content of the water must be less than $10^{-6}$ mol/l, preferably less than $10^{-7}$ mol/l. In practice, commercial or industrial demineralized water or distilled water is used.

The pretreatment of the cationic membrane has the function of impregnating the cationic membrane with water. To this end, the water can be applied over the cationic membrane by painting by means of a brush or by spraying. A preferred means is to immerse the cationic membrane in a bath of demineralized water. The water must be used in an amount at least sufficient to impregnate all of the cationic membrane. The minimum amount of water to be used will depend on the means used for the conditioning pretreatment of the cationic membrane and it can easily be determined by routine laboratory tests. In practice, it proved to be desirable to adjust the amount of water used so that, on conclusion of the pretreatment, the cationic membrane contains more than 0.005 (preferably at least 0.008) kg of water per $m^2$ of the face of the cationic membrane which is intended to adjoin the anionic membrane in the bipolar membrane. The amount of water which impregnates the cationic membrane on conclusion of the pretreatment does not generally exceed 0.1 (preferably 0.08) kg/$m^2$.

The water used in the pretreatment of the cationic membrane can optionally contain additives which promote the impregnation of the cationic membrane, in particular surface-active agents. In any event, these additives must be free from polyvalent metal and from alkali metal.

The conditioning pretreatment of the cationic membrane can optionally comprise an additional treatment which does not involve bringing it into contact with an aqueous solution. However, it is preferable, according to the invention, for the pretreatment of the cationic membrane to essentially comprise bringing it into contact with water, as explained above.

Any appropriate means can be used to join the cationic membrane and the anionic membrane side by side. A preferred means, according to a specific embodiment of the invention, consists in applying the two membranes against each other, in the wet state, while avoiding the formation of air pockets between the two membranes. To this end, in this embodiment of the invention, the anionic membrane is immersed in a bath of demineralized water on conclusion of its conditioning pretreatment. It is possible to carry out this operation at room temperature or at high temperature, provided that the latter remains below the thermal degradation temperature of the anionic membrane or of the cationic membrane.

The bipolar membrane collected on conclusion of the process according to the invention should preferably be stored in the wet state, before its use in an electrodialysis cell.

Compared with the known process described above, with reference to International Application WO 89/01059 (Unisearch Limited), the process according to the invention exhibits the advantage of greater simplicity as regards the pretreatment of the cationic membrane. The result is a decreased use of reagents, in particular of polyvalent metal and of alkali metal hydroxide, and consequently a decrease in the manufacturing cost of the bipolar membrane.

The bipolar membrane obtained by means of the process according to the invention as described above is well suited to the electrochemical decomposition of water and it can consequently be used in electrodialysis techniques using aqueous solutions. It thus finds a use in the manufacture of aqueous alkali metal hydroxide (especially sodium hydroxide) solutions by electrodialysis of aqueous solutions of alkali metal salts, such as alkali metal chloride, carbonate or sulphate.

The invention consequently also relates to a process for the manufacture of an aqueous alkali metal hydroxide solution by electrodialysis of an aqueous solution of an alkali metal salt, according to which electrodialysis is carried out in the presence of a bipolar membrane obtained by means of the process, in accordance with the invention, defined above.

The invention applies especially to the manufacture of aqueous sodium hydroxide solutions by electrodialysis of aqueous sodium chloride solutions, for example by means of the technique described in Patent U.S. Pat. No. 4,238,305.

The examples which follow serve to illustrate the invention.

In the examples, Raipore R-4010 (Pall Rai) cationic membranes and Raipore R-4030 (Pall Rai) anionic membranes were used. Raipore R-4010 cationic membranes are membranes made from fluorinated polymer carrying functional groups derived from sulphonic acid and Raipore R-4030 anionic membranes are membranes made from polymer carrying functional groups derived from quaternary ammonium.

EXAMPLE 1 (in accordance with the invention)

The anionic membrane was subjected to a conditioning pretreatment comprising the following successive stages:

an immersion in an aqueous basic chromic trichloride hexahydrate solution (containing 50 g of chromic trichloride hexahydrate and 2 mol of sodium hydroxide per litre) at room temperature for 24 hours;
a washing by immersion in a bath of demineralized water at room temperature for 15 minutes;
an immersion in a molar aqueous sodium hydroxide solution at 70° C. for 15 minutes;
a washing by immersion in a bath of demineralized water at room temperature for a few seconds.

The cationic membrane was subjected to a conditioning pretreatment which consisted solely of an immersion in a bath of demineralized water for 1 hour at room temperature.

On conclusion of the respective pretreatments of the anionic membrane and of the cationic membrane, they were applied against each other in the wet state and at low pressure, so as to form a bipolar membrane.

In order to evaluate the performance of the bipolar membrane thus obtained, use was made of an electrochemical measuring cell divided into four successive compartments by the bipolar membrane to be tested, arranged vertically, and two Nafion trademark (Du Pont) cationic membranes, arranged vertically, on either side of the bipolar membrane. A nickel cathode and anode were arranged respectively in the two end compartments of the cell. The bipolar membrane was positioned in the cell so that its anionic face was directed towards the anode. A 10 weight % sodium hydroxide solution was made to move in the two end compartments. A 1M aqueous sodium hydroxide solution was made to move in the median compartment comprising the anionic face of the bipolar membrane and a 1M aqueous hydrochloric acid solution was made to move in the median compartment comprising the cationic face of the bipolar membrane. The compartments of the cell were maintained at room temperature.

The anode and the cathode of the cell were connected to the terminals of a direct current source, adjusted so as to generate, in the cell, a current of 1.0 kA per $m^2$ of surface area of the bipolar membrane. The potential difference between the two faces of the bipolar membrane was measured by means of Luggin probes. This potential difference stabilized at 0.88 V.

EXAMPLE 2 (for comparison)

In this test, the anionic membrane and the cationic membrane were each subjected to a conditioning pretreatment identical to that undergone by the anionic membrane in Example 1.

The potential difference between the two faces of the bipolar membrane was measured in the way and under the conditions explained in Example 1. The potential difference stabilized at 0.90 V.

A comparison of Examples 1 and 2 reveals that the bipolar membrane obtained by means of the simplified process of Example 1 (in accordance with the invention) exhibits a performance at least comparable with that of the bipolar membrane obtained by means of the known prior process (Example 2).

I claim:

1. Process for the manufacture of a bipolar membrane, according to which an anionic membrane is joined side by side to a cationic membrane, the membranes having been subjected beforehand to a conditioning pretreatment of the anionic membrane comprising bringing the latter into contact with a compound of a polyvalent metal and with an aqueous alkali metal hydroxide solution and said conditioning pretreatment of the cationic membrane with the aqueous medium essentially comprising bringing the said cationic membrane into contact with water which is essentially free from polyvalent metal and from alkali metal.

2. Process according to claim 1, in which the polyvalent metal and/or alkali metal content of the water is less than $10^{-6}$ mol/l.

3. Process according to claim 1, in which bringing the cationic membrane into contact with water comprises immersing the said cationic membrane in a bath of demineralized water.

4. Process according to claim 1, comprising adjusting the amount of water so that, on conclusion of the pretreatment of the cationic membrane, the latter contains at least 0.008 kg of water per $m^2$ of the face of the cationic membrane which is intended to adjoin the anionic membrane in the bipolar membrane.

5. Process according to claim 1 comprising, in the pretreatment of the anionic membrane, using the polyvalent metal in the form of an aqueous basic solution of a salt of the said polyvalent metal.

6. Process according to claim 1, comprising bringing the anionic membrane into contact with the polyvalent metal before it is brought into contact with the aqueous alkali metal hydroxide solution.

7. Process according to claim 1, in which the polyvalent metal used in the pretreatment of the anionic membrane comprises chromium.

8. Process according to claim 7, the polyvalent metal compound used in the pretreatment of the anionic membrane comprising chromic trichloride hexahydrate.

9. Process according to claim 1, the aqueous alkali metal hydroxide solution used in the pretreatment of the anionic membrane comprising sodium and/or lithium hydroxide.

10. Process for the manufacture of an aqueous alkali metal hydroxide solution by electrodialysis of an aqueous solution of an alkali metal salt, in the presence of a bipolar membrane obtained by means of a process in accordance with claim 1.

* * * * *